Figure 13:
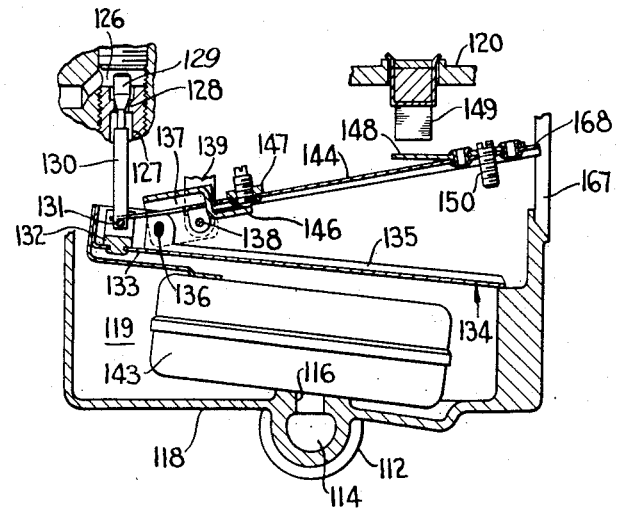

Dec. 29, 1953  W. S. LANDON  2,664,099
LIQUID LEVEL CONTROL MEANS
Filed May 15, 1947  4 Sheets-Sheet 1
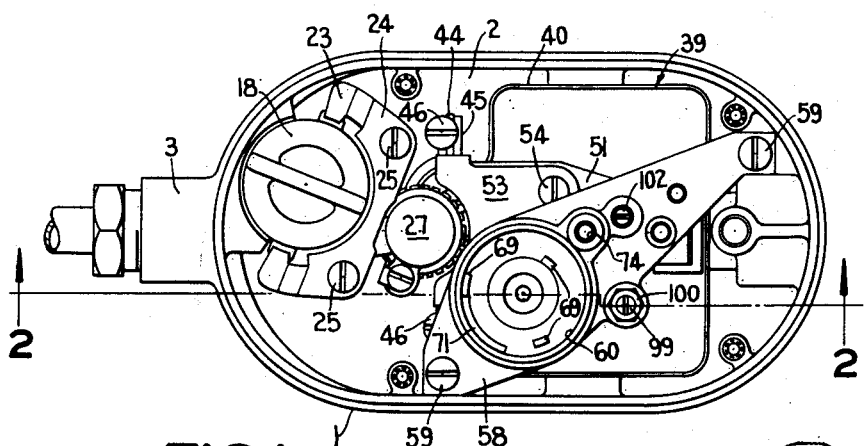
FIG.1
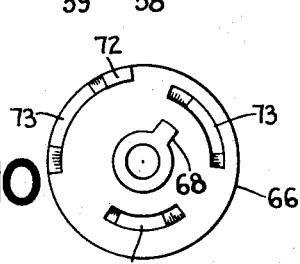
FIG.10
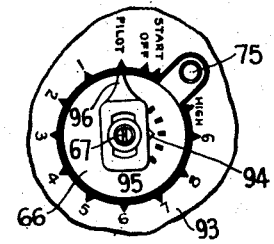
FIG.7
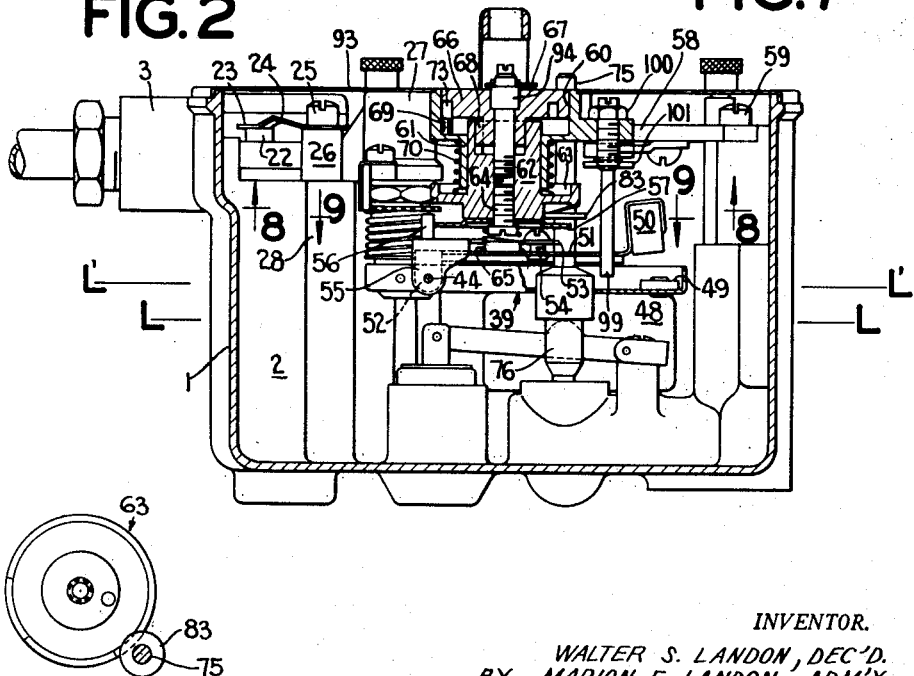
FIG.2
FIG.8
INVENTOR.
WALTER S. LANDON, DEC'D.
BY MARION E. LANDON, ADM'X.
BY Andrew K. Foulds
her ATTORNEY Dec. 29, 1953 W. S. LANDON 2,664,099
LIQUID LEVEL CONTROL MEANS
Filed May 15, 1947 4 Sheets-Sheet 2
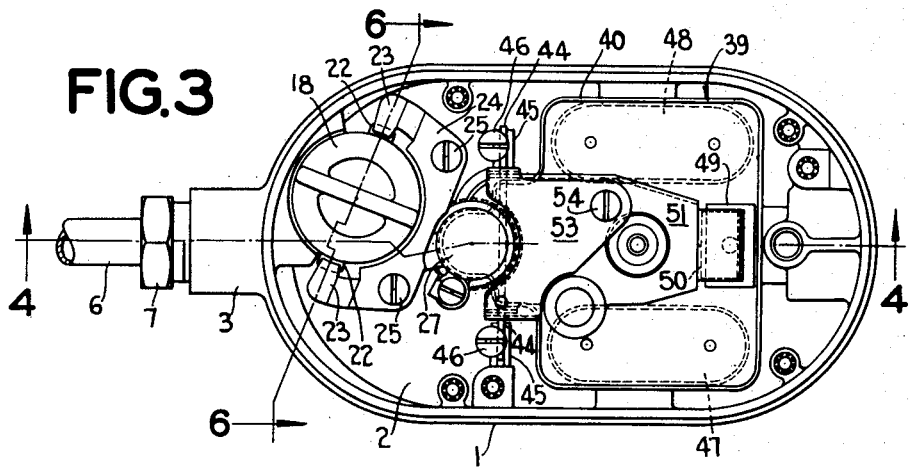
FIG.3
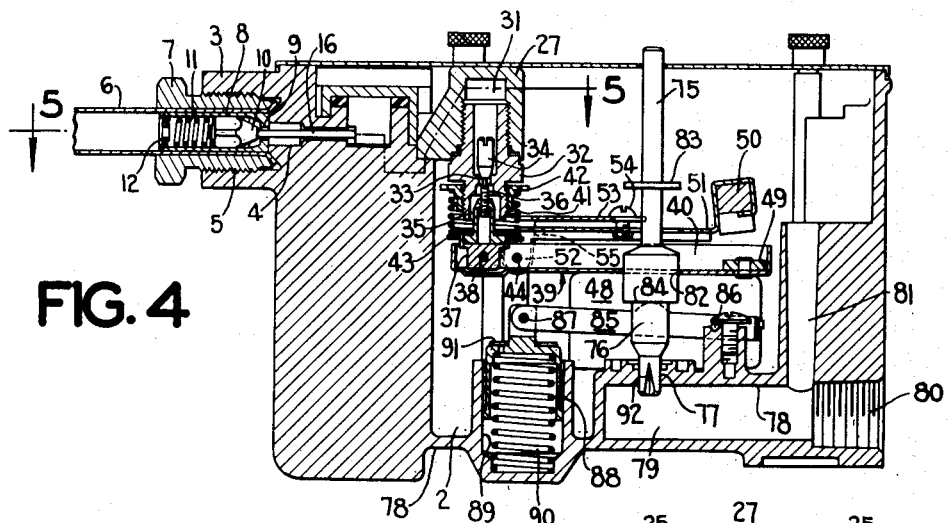
FIG.4
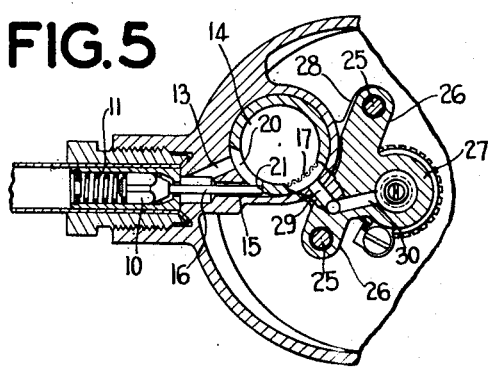
FIG.5
FIG.6
INVENTOR.
WALTER S. LANDON, DEC'D.
BY MARION E. LANDON, ADM'X.
BY Andrew K. Foulds
her ATTORNEY Dec. 29, 1953   W. S. LANDON   2,664,099
LIQUID LEVEL CONTROL MEANS
Filed May 15, 1947   4 Sheets-Sheet 3
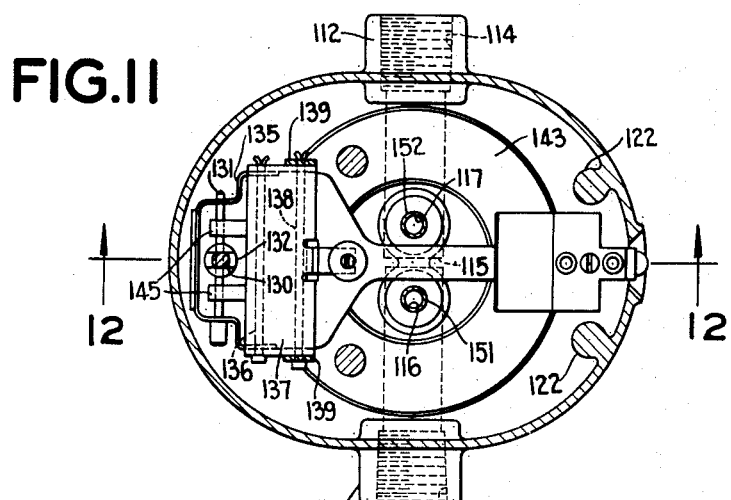
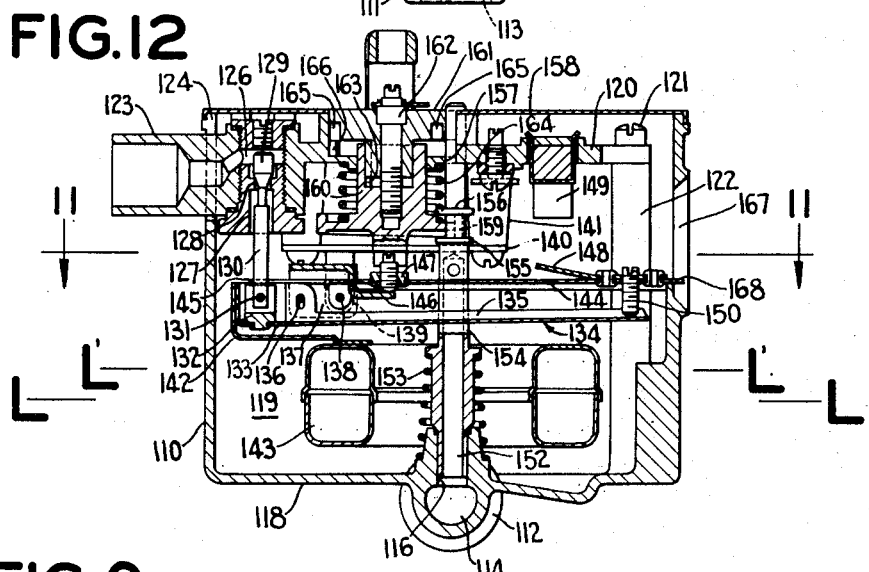
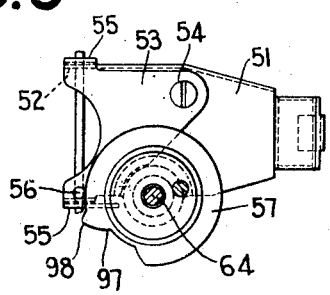
INVENTOR.
WALTER S. LANDON, DEC'D.
BY MARION E. LANDON, ADM'X.
BY Andrew K. Fuller
her ATTORNEY

INVENTOR.
WALTER S. LANDON, DEC'D.
BY MARION E. LANDON, ADM'X.

BY Andrew K. Fowler
her ATTORNEY

Patented Dec. 29, 1953

2,664,099

UNITED STATES PATENT OFFICE 2,664,099

LIQUID LEVEL CONTROL MEANS

Walter S. Landon, deceased, late of Detroit, Mich., by Marion E. Landon, administratrix, Detroit, Mich., assignor to Detroit Controls Corporation, Detroit, Mich., a corporation of Michigan Application May 15, 1947, Serial No. 748,299

9 Claims. (Cl. 137—391)

1

This invention relates to new and useful improvement in liquid level control devices and more particularly to such a device which is particularly adapted for controlling the supply of liquid fuel to a gravity fed burner.

An object of the invention is to provide a device which will maintain a substantially constant liquid level and therefore liquid head on the outlet port or orifice.

Another object is to provide safety means for stopping the flow of fuel in the event of failure of the normally acting means to maintain the constant level.

Another object is to provide a metering control for the outlet port in which the rate of initial flow from the control device is predetermined irrespective of the rate of opening movement of the valve closure means Another object is to provide a novel inlet shut-off means.

The invention consists in the improved construction and cooperable relation of parts to be more fully described hereinafter and the novelty of which will be particularly pointed out and distinctly claimed.

In the accompanying drawings to be taken as a part of this specification, there are fully and clearly illustrated several preferred embodiments of the invention, in which drawings, Figure 1 is a top plan view of one form of the control device having the cover plate removed to show internal construction, Fig. 2 is a view in vertical section on the line 2—2 of Fig. 1 but showing the cover member in place, Fig. 3 is a top plan view similar to Fig. 1, but having the outlet port metering valve and its supporting structure removed, Fig. 4 is a view in section on the line 4—4 of Fig. 3, Fig. 5 is a detail view in section on the line 5—5 of Fig. 4, Fig. 6 is a detail view in section on the line 6—6 of Fig. 3, Fig. 7 is a detail plan view of a portion of the cover member showing the metering valve manual control member and its cooperating indicia, Fig. 8 is a detail view in section showing the metering valve operating cam mechanism and taken upwardly on the line 8—8 of Fig. 2, Fig. 9 is a detail view in section on the line 9—9 of Fig. 2 showing certain reset and float supporting structure, Fig. 10 is a bottom plan view of a metering valve hand grip adjustment member,

2

Figure 14:
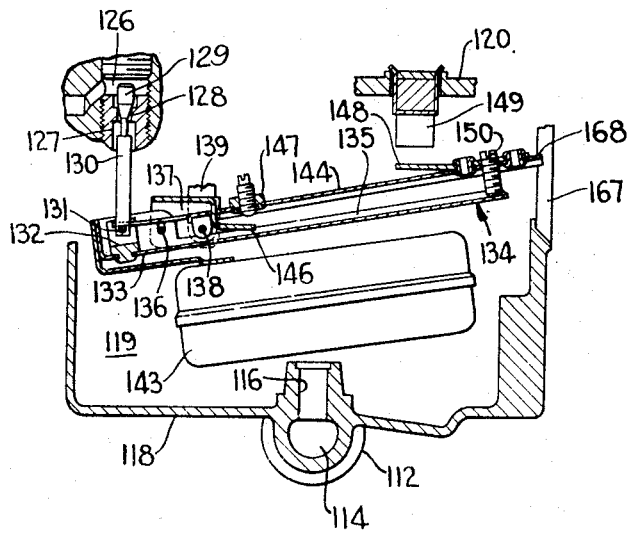

Fig. 11 is a view in plan section of another form of the invention taken on the line 11—11 of Fig. 12, Fig. 12 is a view in vertical section on the line 12—12 of Fig. 11, Fig. 13 is a detail view of certain lever mechanism showing the inlet valve controlling float member in float chamber empty or float sunk position, and Fig. 14 is a view similar to Fig. 13, but showing the float member and lever mechanism in safety position resulting from excess liquid level in the chamber.

Referring to the drawing by characters of reference and particularly Figs. 1 to 10 inclusive, the reference numeral 1 designates generally a casing providing a liquid level chamber or reservoir 2 which is of substantially rectangular form with rounded end portions or walls. Above the maximum possible liquid level in the chamber 2 and opening through a laterally projecting inlet nipple 3 there is an inlet passageway 4 having an enlarged internally screw threaded bore 5. A flared inlet pipe or conduit 6 leading from a source of liquid fuel supply such as a tank or pump is secured in the bore 5 by a sleeve flare nut 7. A cartridge type shut-off valve 8 is contained within the outlet end of the tube or pipe 6 and comprises a cylinder having a valve port 9 through its end wall and containing a check valve member 10 which is urged toward port closing position by a coil spring 11 held under compression against a ported aperture member or disc 12 secured in the outer end of the member 8. The passageway 4 has a branch portion 13, see Fig. 5, which opens substantially laterally into a vertically positioned cylindrical strainer chamber 14. The passageway 4 also has an extension 15 opening substantially tangentially into the chamber 14 and which provides a guide-way for a valve operating rod 16 extending from the valve member 10 and projecting into the chamber 14. Within the chamber 14 there is a cylindrical strainer 17 closed at its bottom end and secured and sealed at its upper end to a flanged substantially cylindrical cap member 18, see Fig. 6, which substantially fits the upper end of the chamber 14. The cylindrical wall of the member 18 below its transverse closure wall 19 has a circumferential recess 20 providing an inlet port to the interior of the strainer 17 and alined with the passageway portion 13. One side wall 21 of the recess 20 serves as a thrust member or abutment receiving the free end of the valve operating rod 16. The cap member flanges or ears 22 serve as locking dogs engageable under spring fingers 23 of a substantially U-shaped resilient plate member 24 secured by screws or the like 25 to bosses 26 on an inlet fitting member 27 which is clampable by the screws 25 to bosses 28 projecting from the strainer member housing. The recess wall 21 holds the valve member 19 in open position and the spring 11 under compression. Through the side wall of the strainer housing there is an outlet port 29 which terminates within the strainer chamber wall and opens upwardly through the top surface of the portion interconnecting the bosses 28. The outlet port 29 joins a port or passageway 30 in the fitting member 27 extending at an upward inclination to the central inlet valve chamber 31. Screw threaded into the chamber 31 there is a valve port member 32 having an inlet port 33 with oppositely facing valve seats. Cooperable with these seats there is a normally acting inlet valve 34 and a safety valve member 35 which are interconnected by a screw threaded stem 36 extending from the valve member 34 and adjustably screw threaded in the valve member 35, the valve member 34 being provided with a screw-driver slot or the like for relative adjustment and spacing of the valve members from each other. The lower or safety valve member 35 has the convex supporting surface which seats on the inner bottom wall or base of a cuplike supporting member 37 which is pivotally connected by a pin 38 to a pan-like lever 39, the pin 38 extending through apertures in the opposite side wall flanges 40. The thickness or height of the base flange of the valve member 35 is less than the height of the rim or inner side wall of the supporting member 37, as will be apparent from Fig. 4, so that lost motion of the valve member 34 relative to the lever 39 is permitted to the extent of this difference in heights. The normally acting upper valve member 34 is urged toward its seat by gravity and, when the lost motion is taken up, by a coil spring 41 positioned between an adjustable sleeve abutment 42 screw threaded on the seat member 32 and an abutment member 43 comprising an apertured flanged disc receiving the lower valve member 35 and seating on the supporting member 37. The lever member 39 is urged counter-clockwise by the spring 41 and is pivotally supported by a shaft 44 which is supported at its end portions in V-notched bosses 45 projecting upward from the casing bottom wall, the shaft being held and located in the V-notches by the head portions of screws 46. Secured as by rivets or the like to the underside of the member 39 there are laterally spaced or front and rear positioned float members 47 and 48 which cooperate with the spring 41 by their buoyant force to move the valve member 34 toward closed position. Cooperable with the lever member 39 there is a magnetic member or armature 49 fixed centrally at the free end portion of the lever member 39 and on its upper face. Cooperable with the armature 49 there is a horse-shoe type permanent magnet 50 carried by a supporting arm 51 having one or more longitudinal reinforcing flanges and fulcrum ears 52 pivotally supporting the arm on the shaft 44. The arm 51 is adjustably connected to an overlying substantially parallel arm 53 by means of an adjustment screw 54 extending through the arm 53 and screw threaded into the arm 51. The arm 53 has downward extending side flanges 55 which overlap the ears 52 and are apertured for passage of the shaft 44 therethrough and fulcruming of the arm 53 thereon. The arm 53 has an upward extending post 56, see Figs. 2 and 9, cooperable with a combination cam and stop member 57 to normally support the magnet 50 in predetermined relation to the armature 49 when the valve member 34 is seated to close the port 33 in normal float operation.

Extending diagonally across the float chamber there is a saddle-like supporting member or plate 58 which is secured adjacent its ends by screws 59 to supporting bosses projecting from the casing side walls. In the top face of the member 58 there is a substantially cylindrical recess 60 having concentric therewith a downward extending tubular flange and guide sleeve 61. Rotatably fitting in the sleeve 61 there is a cam member 62 having a cam wheel 63 positioned below the lower end of the sleeve 61 and having a helical cam underface in the form of a spiral flange. The combination cam and stop member 57 is clamped to the lower end face of the member 62 by a screw 64. The magnet supporting arm 53 is held with the post 56 against member 57 by a coil spring 65 secured at one end to the plate member 57 by the head of the screw 64 and bearing at its other end against the lever arm 51. The cam member 62 is supported by a hand grip member 66 which rotatably fits in the saddle member recess 60, the members 66 and 62 being secured together by a bolt 67 and being held for rotation as a unit by a rib and keyway 68. The grip member 66 is normally supported on spaced lugs 69 and is held against the top faces thereof by a coil spring 70 held under compression between the underface of the member 58 and the cam wheel portion 63. Through the bottom wall of the recess 60 there is an arcuate aperture 71 terminating at one end in the outermost one of the lugs 69 which serves as a stop to limit rotation of the member 66 to about 350°. Cooperable with the slot 71 there is a finger 72, the member 66 also having arcuate slots 73 cooperable with and to receive the lugs 69 when the lugs and slots are in registry and the finger 72 is in registry with the slot 71, to permit the spring 70 to move the cam member 62 downward. Reciprocally guided through an aperture 74 through the saddle member 58 at the side of the recess 60 is the stem 75 of a metering valve 76 controlling flow through an outlet port 77 in the bottom wall 78 of the chamber 2. The portion of the wall 78 through which the port 77 opens, forms the top wall of an outlet passageway 79 having an internally screw threaded end 80 for receiving the fuel burner supply pipe. A vent passage 81 leads upward from the passageway 79 into the chamber 2 above the maximum possible liquid level therein. The valve stem 75 extends downward through alined apertures in the lever arm 51 and through the bottom wall of the pan-like lever member 39, the stem 75 substantially fitting the pin aperture 82 by permitting flow therethrough into the chamber 2. On the stem 75 there is a lateral flange or projection 83 providing a cam follower portion cooperable with the helical surface of the cam wheel 63. The stem 75 also has a downward facing shoulder 84 cooperable with a lever 85 pivoted on a shaft 86 and secured at its free end by a pin 87 to a dash-pot piston 88. There is a dash-pot chamber 89 formed in the bottom wall 78 in which the piston 88 is movably positioned, said piston being urged upward by a coil spring 90 so as to hold the cam follower flange 83 in engagement with the cam wheel 63. An upward opening check valve 91 carried by the piston 88 permits rapid downward movement of the lever 85 and metering valve 76 while causing a delayed gradual opening movement of the valve 76. It will be apparent that the force of the spring 90 and the clearance of piston 88 can provide a predetermined time delay in the opening movement of the valve 76 to its full open position. The valve 76 is provided with a fuel metering slot 92 which may be of the usual inverted V groove type.

The chamber 2 is closed by a cover member 93 which is apertured to receive the cylindrical wall of the recess 60 and for passage of the stem 75 therethrough. Secured on the upper end of the bolt 67 there is a pointer 94 cooperable with indicia 95 on the top face of the member 66 to indicate the position of the valve 76 relative to its seat in the pilot flow position of the hand grip member 66 when the cam surface of wheel 63 is at its minimum flow position and the member 66 is resting on the top faces of the lugs 69, i. e. when the slots 73 are out of registry with the lugs 69. This adjustment is, of course, made when the pointer 96 is alined with the mark designated "Pilot" on the cover member 93. On the cover member 93 there is also the position designated "Off" which corresponds to registry of the lugs 69 with the slots 73 and in which position the valve 76 is seated on the wall 78 to close the port 77. Also in clockwise rotation from the "Pilot" point and beyond the "Off" point there is a point designated "Start" which is the position to and beyond which the pointer 96 is moved to bring the valve member 35 away from its inlet port seat without, however, seating the upper valve member 34 so that liquid fuel can flow into the empty chamber 2. This "Start" position corresponds to the circumferentially recessed portion 97 of the combined cam and stop disc 57, see Fig. 9. It will be noted that the disc 57 has a protuberant cam portion 98 for the purpose of disengaging the magnet 50 from the armature 49, a stop rod 99 cooperating with the pan-like lever member 39 to limit upward movement of the armature 49 to accomplish this purpose. The rod 99 is adjustably screw threaded through the screw member 58 and is held in adjusted position by a lock nut 100. Opening movement of the valve 76 may be limited by a stop member 101 cooperable with the stem projection or flange 83 and adjustable screw threaded through the saddle member 58, it being provided with a screw driver slot adjustment 102, see Fig. 1.

The operation of the device in Figs. 1 to 10 is as follows:

When the strainer chamber cover member 18 is locked in position as shown in Fig. 1 then the valve member 10 is in open position so that fuel from the source of supply, not shown, will feed through the inlet pipe 6 into the interior of the strainer 17 and therethrough into the passageway 29 and 30 leading to the inlet valve chamber 31. If the float chamber 2 is empty, the float mechanism 39 will be in its lowermost or down position so that the valve member 35 will be seated against and closing the port 33. In order to admit fuel to the chamber 2, it will, therefore, be necessary to open the valve member 35 and this is accomplished by rotating the hand grip member 66 until the finger 95 is at the "Start" position of Fig. 7 which will permit the post 56 to drop into the recess portion 97, see Fig. 9, so that the magnet 50 will drop into attractive position to the armature 49. The hand grip member 66 is then rotated counter-clockwise to or beyond the "Off" position which will push post 56 toward the left facing Fig. 2 thereby rotating the magnet 50 upward and lifting the valve member operating lever mechanism 39 to a position in which the valve members 34 and 35 will both be unseated so that fuel will flow through the port 33 into the pan-like lever member 39 and thus through the aperture 82 into the chamber 2. The protuberance 98 will move the post 56 sufficiently counter-clockwise so that the magnet 50 will be freed from the armature 49 due to the arm member or pan 39 engaging the post 99 and being stopped in its upward movement.

The inflowing fuel to the chamber 2 will fill the same to the desired normal substantially constant liquid level indicated by the line L—L, at which level the float members 48 will seat the valve member 34 to stop further inflow of liquid through the port 33. When the hand grip member 66 is rotated further in a counter-clockwise direction, the cam surface of the wheel 63 will be lifted away from the valve stem flange 83 and permit the dash-pot spring 90 to move the valve 76 toward open position. In the "Off" position the lugs 69 will be in their respective recesses 73. The first action upon counter-clockwise rotation of the hand grip member 66 toward "Pilot" position will be a camming of the hand grip member 66 and the cam wheel 63 upward by the inclined end portions of the slots 73 which will bring the hand grip member 66 to the position of Fig. 2 without, however, having caused any upward travel of the stem flange 83 upon the cam surface of the cam wheel 63. Irrespective of the rate of rotation of the hand grip member 66 and the consequent rate of lifting of the cam surface away from the flange 83, the rate of opening movement of the valve 76 will be predetermined by the action of the dash-pot piston 88 and its spring 90, so that for normal operation of the hand grip member for burner igniting operation when the hand grip member would be rotated to full counter-clockwise or "High" position the flow of fuel through the metering valve outlet 77 to the burner will have a time delay and not flood the burner before the fuel can be ignited. Irrespective of the position of the valve 76 under the control of the cam wheel member 63, the float mechanism will tend to maintain a substantially constant liquid level in the chamber 2 and more nearly constant than with the usual simple inlet valve and float member arrangement. This is due to the pan-like lever member 39 which counterweighs the float members 48 by the weight of the incoming liquid so that the float members 48 will be depressed into the liquid thereby raising the level in the float chamber by liquid displacement, whereas as when the normally acting valve member 34 closely approaches its seat the quantity of liquid in the pan-like lever member 39 will be decreased thereby resulting in the float members 48 displacing less liquid within the chamber 2. Should the valve member 34 fail to close the port 33 so that the liquid level in the chamber 2 increases above the line L—L, the float members 47 and 48 will follow with the increasing level due to the lost motion of the valve member 34 relative to its supporting member 37 and lever 39. When the level gets to some predetermined higher liquid level such for example, as the line L'—L', which further level is adjustable by the screw 54, then the magnet 50 will actively attract the armature 49 and lift the lever arm 39 with a quick action thereby tightly seating the valve member 34 to close the port 33 and shut off further inflow of fuel to the chamber 2. If the float members 47 should become "water-logged" or sink to the bottom of the chamber 2 for any reason, then the valve member 35 will be lifted to port closing position against the downward facing seat of the port 33 thereby stopping further inflow of fuel to the chamber 2. It will be apparent that the end of the stem 75 which projects above the cover plate 93 permits of the application to the control device of automatic means for actuating the valve 76 such, for example, as a thermostatic bimetal heat motor or the like which might be remotely controlled, the cam wheel 63 under such conditions being positioned to determine the maximum opening movement of the valve 76 when the stem 75 is released by the automatic actuator.

Referring to Figs. 11 to 14 inclusive, the reference numeral 110 designates the casing of a constant level chamber or reservoir having oppositely directed outlet fittings 111, 112 with alined outlet passageways 113, 114 respectively which are separated from each other by a vertical intermediate wall 115. Discharging into these passageways 113, 114 respectively are outlet ports 116, 117 through the bottom wall 118 of the casing 110. Supported in the upper end portions of the casing chamber 119 there is a support structure or saddle member 120 held in position by screws 121 of which but one is shown and which are threaded into casing bosses 122. The member 120 carries an inlet fitting 123 which projects through an aperture 124 in the side wall of the casing 110 and through which there is an inlet passageway 125 which leads into a valve chamber 126. The lower end of the chamber 126 is closed by a valve seat member 127 screw threaded upwardly thereinto and having a valve port 128 controlled by a downward seating valve member 129. The valve stem 130 is pivotally connected by a pin 131 to a journal member 132 which is rigidly fixed to the bottom wall 133 of a pan-like lever member 134 having side flanges 135. A shaft or pivot pin 136 extends through the flanges 135 and is supported at its ends in a bracket 137 which is pivoted on a shaft 138 supported at its ends in bracket arms 139 depending from a supporting plate 140 secured to depending posts 141 extending downward from the saddle member 120. The flanges 135 are slotted so that the lever arm 134 rests on the shaft 136 but such that the arm 134 can rock upwardly on the valve stem pivot pin 131 as a center. Secured to the end portion of the pan-like lever arm 134 beneath the valve port 128 which discharges into the pan-like lever member, there is a float member supporting bracket 142 carrying an annular float member 143 positioned substantially concentrically within the chamber 119 and in surrounding relation to the outlet ports 116, 117. Also pivoted on the shaft 138 there is an armature supporting lever 144 having parallel arms 145 which overlie the pivot pin 131 on opposite sides of the journal member 132 in position to bear downwardly against the shaft 131. The lever 144 is apertured for passage of an angularly bent lug 146 therethrough which projects from the bracket 137 such that the lug end portion lies beneath the lever arm 144. An adjustment screw 147 adjustably screw threaded through the lever arm 144 seats downward against the lug 146 to adjustably position the bracket 137 and accordingly the position of the float member supporting shaft 136 will be to regulate the liquid level at which the float member 143 will close the valve member 129. The armature 148 cooperates with a horseshoe type permanent magnet 149 carried by the saddle member 120 and extending downward therefrom. An adjustment screw 150 carried by the arm 144 extends downward into abuttable relation to the free end portion of the bottom wall of the pan-like arm 134 to determine the upward movement of the arm 134 prior to movement of the arm 144 thereby and therewith.

The outlets 116, 117 are controlled respectively by metering valves preferably of the metering slot air vented type 151, 152 which are of identical construction and similarly controlled and therefore the construction and control means for the valve 152 alone will be described.

A spring 153 surrounding the valve stem 154 and bearing against the bottom wall 118 urges the valve 152 toward open position. Above the lever arms 134 and 144 the valve stem is provided with a cam follower comprising vertically spaced flanges 155, 156, the stem extending upward through a guide-way 157 through the saddle member 120 and through an aperture through the casing cover member 158. Cooperable with the flanges 155 and 156 there is a cam wheel 159 carried by a shaft 160 guided in a cylindrical aperture through the saddle member 120. The underface of the peripheral portion of the wheel 159 is a spiral cam surface which bears against the upper face of the stem flange 155 to regulate the opening movement of the valve 152 under the force of the spring 153. The upper peripheral face of the wheel 159 bears against the underface of the stem flange 156 so that the valve stem 154 can be positively lifted by upward movement of the hand grip member 161. The hand grip member 161 and the cam wheel shaft 160 are secured together by the bolt 162 and cooperable land and groove 163. The cam wheel 159 is urged downward to urge the valve member 152 toward closed position against the force of the spring 153 by a spring 164 which surrounds the shaft 160 and is held under compression between the wheel 159 and the underface of the saddle member 120 which sufficient force to overcome the spring 153. The hand grip member 161 is provided with arcuate slots 165 which cooperate with lugs 166 similarly to the recesses or slots 73 and lugs 69. The side wall of the casing 110 has an opening 167 therethrough above the maximum possible liquid level in the chamber 119 and through which a finger engageable end portion 168 of the armature lever arm 144 extends in order to reset the lever mechanism after safety operation. It will also be apparent that the end portion 168 can be manually lifted into magnet holding position to lock the inlet valve member 129 in closed position to protect the valve member and its seat against the deleterious effect of vibration during shipment.

The operation of the control device of Figs. 11 to 14 is as follows:

If the inlet valve member 129 is locked in closed position, then the finger grip member 168 would be pushed downward to free the valve holding fingers 145 from their locking engagement against the valve stem pivot pin 131. The end portion 168 normally seats upon the lower end wall of the slot or aperture 167 to support the lever arm 144 in predetermined position so that the float member 143 can be adjusted as above described. The valve member 129 now being open, liquid fuel will flow into the chamber 119 onto the pan-like lever arm 134 and tend to counter-balance in part the buoyant force of the float member 143 as above described with respect to Figs. 1 to 10 and when the liquid level rises to the desired substantially constant level indicated by the line L—L, Fig. 12, the lever mechanism will be in positions shown in Fig. 12 and the valve member 129 will be seated. The metering valves 151, 152 may be opened to regulate the out-flow through the outlet passageways 113 and 114 respectively as above described in connection with Figs. 1 to 10, and as will be apparent from the foregoing descriptions of these Figs. 11 to 14. If the liquid level increases above the line L—L to the maximum desired safety level such as the line L'—L' of Fig. 12, then the valve member 129 being limited in its downward seating movement, the pin or shaft 131 will serve as a fulcrum for the float member 143 and the lever arm 134, which, due to its slotted flanges can rotate counter-clockwise upwardly without limitation within its desired range of operation by the shaft 136. When the lever arm 134 has moved upward sufficient to pick up the adjustment screw 150 and lift the armature 148, then there will be very little increased movement required before the attractive force of the magnet 149 is sufficient to quickly pull the armature 148 and its lever 144 upward thereby causing the fingers 145 to strike sharply against the pivot or shaft 131 and drive the valve member 129 to its seat thus closing and sealing the port 128. It may be noted that the force of the magnet 149 is strong enough to attract and move upwardly the armature 148 upon very slight upward movement of the arm 144 by the arm 134, the screw 150 determining the extent of free movement of the arm 134 before there is movement imparted to the armature 148. The position of the parts upon this safety operation due to excess liquid level is shown in Fig. 14.

In the event the float member 143 is in its down position due to the chamber 119 being empty, or has sunk due to "water-logging," the weight of the float member and the valve member 129 on the bracket 137 which is pivoted on the shaft 138 will cause the bracket 137 to rock counter-clockwise facing Fig. 12 on its supporting shaft 138 thereby moving the lug portion 146 upward so as to raise the armature 148, with the result that the magnet 149 will pull the arm 144 upward and cause the fingers 145 to engage the valve supporting pin 131. The magnet 149 has sufficient force to overcome the weight of the float member 143 and the valve member 129 so that the fingers 145 will pull downward on the valve stem 130 and seat the valve member 129. The position of the parts when the float is in this down position is shown in Fig. 13.

What is claimed and is desired to be secured by Letters Patent of the United States is:

1. A liquid flow controlling device comprising a casing with a downward discharging inlet and with an outlet, a valve member controlling said inlet, a float member operatively connected to said valve member and operable to modulate the extent of opening thereof to maintain a constant level of liquid in said casing, a liquid receiving member positioned beneath said inlet and arranged to receive liquid from said inlet and continuously to discharge liquid so received to said casing, said receiving member being arranged for movement by said float member, an armature movable by said receiving member, a magnet cooperable with said armature and acting thereon to close said valve member upon predetermined movement of said receiving member by said float member, and said receiving member counteracting by weight of received liquid the buoyant force of said float member.

2. A liquid flow controlling device, comprising a casing having a chamber with a downward discharging inlet and with a substantially centrally located outlet, a liquid receiving member positioned beneath said inlet and arranged to receive and continuously discharge liquid to said chamber, and float means having spaced portions positioned on opposite sides of said outlet and operable to move said receiving member, a valve member controlling said inlet and operable by said float means, the weight of received liquid on said receiving member varying with the extent of opening of said valve member and counteracting the buoyant force of said float means, said float means including a magnetic surface portion, a magnet cooperable with said magnetic portion to control movement of said float means above a predetermined liquid level, a moveable member carrying said magnet in overlying relation to said float means, a metering valve controlling said outlet and extending upward between said float portions, a supporting structure carried by said casing and carrying said float means, said inlet valve member and said metering valve, cam means carried by said supporting structure and having a helical cam surface, said metering valve having a lateral projecting portion cooperable with said cam surface, means holding said projecting portion and said surface in contact, and means moveable with said cam means and determining the position of said magnet carrying member.

3. A liquid flow controlling device, comprising a casing having a chamber with an inlet and an outlet, a float operated valve controlling said inlet, a float member for operating said valve, cooperable magnet and armature members, means supporting one of said members for movement, means holding said one member in predetermined position, the other of said members being movable by said float member into attractive moving relation to said one member and acting upon magnetic movement to close said valve, a valve member controlling said outlet, means operable to actuate said valve member, and means operable by said last-named means to move said one member out of said predetermined position and attractive relation to the said other of said members thereby to condition said valve for operation by said float member.

4. A liquid level controlling device, comprising a casing having a chamber for liquid with an inlet and an outlet, a valve controlling said inlet, a float responsive to liquid level and operable upon occurrence of a predetermined level to close said valve, cooperable magnet and armature members, one of said members being movable with said float, lost motion means operatively inter-connected between said float and said valve and providing for overtravel of said float upon increase of liquid level above said predetermined level, said float moving said one member into attractive relation to the other member upon such overtravel, safety means cooperable with said members and operable to move said valve to closed position, said safety means being actuated upon magnetic movement of one of said members by the other, a metering valve controlling flow through said outlet, means operable to actuate said metering valve, and means operable by said last-named means to reset said safety means after actuation by said magnetic means.

5. A liquid flow controlling device, comprising a casing having a chamber with a downward discharging inlet and an outlet, valve means controlling said inlet, float means responsive to liquid level in said chamber and operatively connected to said valve means to actuate the same, said float means comprising a pan-like member and supporting float member, said pan-like member being positioned beneath and to receive liquid from said inlet and continuously discharging the received liquid into said chamber, lost-motion means operatively inter-connected between said float means and said valve means and providing for overtravel of said float means upon seating of said valve means, and magnetic means cooperable with said float means to take up the lost-motion and positively to close said valve means on rise of liquid level in said chamber above a predetermined level at which said valve means normally closes.

6. A liquid flow controlling device, comprising a casing having a chamber with a downward discharging inlet and an outlet, a valve seat member in said inlet having a port providing oppositely facing valve seats, valve means controlling flow through said port and including spaced facing valve members, a stem joining said valve members and extending through said port, float means responsive to liquid level in said chamber and operatively connected to said valve means to actuate the same, said float means comprising a pan-like member and a supporting float member, said pan-like member being positioned beneath and to receive liquid from said inlet and discharging the received liquid into said chamber, lost-motion means operatively inter-connected between said float means and said valve means and providing for overtravel of said valve means, upon seating of said valve means, and magnetic means cooperable with said float and means to take up the lost-motion and positively to close said valve means against one of said seats on rise of liquid level in said chamber above a predetermined level at which said valve means normally closes against said one of said seats, said float means acting upon predetermined decrease of liquid level below said predetermined level to urge said valve means against the other of said seats.

7. A liquid flow controlling device, comprising a casing having a chamber with a downward discharging inlet and an outlet, a valve seat member in said inlet having a port providing oppositely facing valve seats, a valve means controlling flow through said port and including spaced facing valve members, a stem joining said valve members and extending through said port, float means responsive to liquid level in said chamber and operatively connected to said valve means to actuate the same, said float means comprising a pan-like member and a supporting float member, said outlet being positioned beneath said pan-like member, said pan-like member having an aperture therethrough alined with said outlet, a metering valve controlling said outlet and having an operating stem extending upward through said aperture, said pan-like member being positioned beneath and to receive liquid from said inlet and discharging the received liquid into said chamber, lost-motion means operatively inter-connected between said float member and said valve members and providing for overtravel of said float means upon seating of said valve means, and magnetic means cooperable with said float means to take up the lost-motion and positively to close said valve means against one of said seats on rise of liquid level in said chamber above a predetermined level at which said valve means normally closes against said one of said seats, said float means acting upon predetermined decrease of liquid level below said predetermined level to urge said valve means against the other of said seats.

8. A liquid flow controlling device as defined in claim 1 wherein there is provided a lever pivotally connecting said float member and said valve member, a pivoted bracket supporting said lever, and said magnet and armature cooperating to move said bracket upon said predetermined movement of said float member to close said valve member.

9. A liquid flow controlling device as defined in claim 1 wherein there is provided a lever pivotally connecting said float member and said valve member, a pivoted bracket supporting said lever, lost motion means operatively inter-connected between said float member and said valve member and permitting movement of said float member relative to said valve member upon increase of liquid level above a predetermined level, the weight of said lever and float member tending to rotate said bracket, a lever arm moveable by said bracket upon rotation thereof, said magnet and armature being operable to move said arm upon movement thereof by said bracket, means operable by movement of said arm to move said valve member to closed position, and means to transmit movement from said lever to said arm upon lost motion movement of said float member to render said magnet and armature effective to close said valve member.

MARION E. LANDON,
*Administratrix of Walter S. Landon, deceased.*

References Cited in the file of this patent

UNITED STATES PATENTS

| Number | Name | Date |
|---|---|---|
| 2,199,538 | Curry | May 7, 1940 |
| 2,207,123 | Johnson | July 9, 1940 |
| 2,230,911 | Russel | Feb. 4, 1941 |
| 2,271,183 | De Lancey | Jan. 27, 1942 |
| 2,293,903 | Johnson | Aug. 25, 1942 |
| 2,358,040 | Williams | Sept. 12, 1944 |
| 2,387,858 | Russel | Oct. 30, 1945 |
| 2,405,126 | Bates | Aug. 6, 1946 |